Aug. 5, 1969  I. M. WARD  3,459,077
TOOL POSTS
Filed May 22, 1967
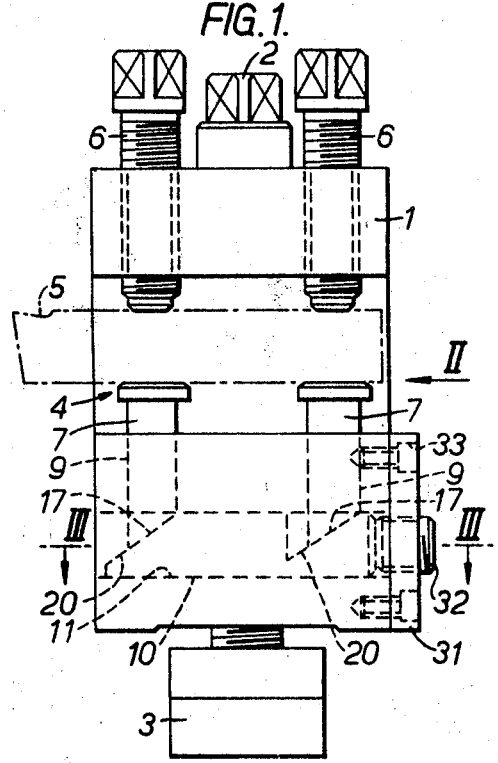
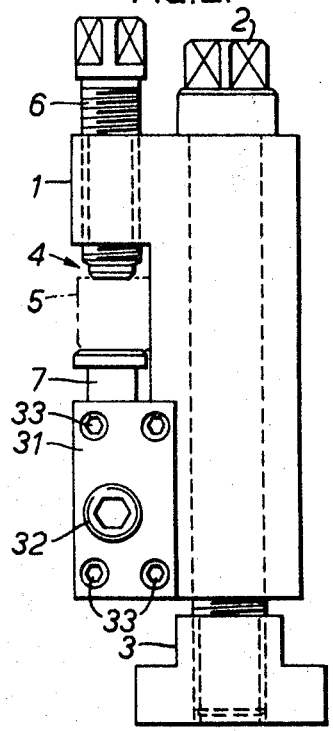
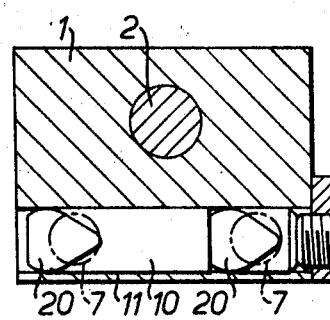
Inventor:-
Ivan Malcolm Ward
By: Watson, Cole, Grindle + Watson
Attorneys

United States Patent Office 3,459,077
Patented Aug. 5, 1969

3,459,077
TOOL POSTS
Ivan Malcolm Ward, Bulkington, near Nuneaton, England, assignor to Geo. H. Wilson (Shilton) Limited, Bedworth, Nuneaton, England, a British company
Filed May 22, 1967, Ser. No. 640,293
Claims priority, application Great Britain, Feb. 10, 1967, 6,497/67
Int. Cl. B23b 29/00
U.S. Cl. 82—37         2 Claims

ABSTRACT OF THE DISCLOSURE

A tool post is disclosed for holding the shank of a tool between clamping screws on one side thereof and abutment pins on the opposite side thereof. The abutment pins are axially adjustable and the ends of the abutment pins opposite the ends contacting the tool shank are inclined. Inclined faces on an axially adjustable actuating pin cooperate with the inclined ends of the abutment pins to impart axial movement thereto for finally setting the position of the tool in the tool post prior to firmly clamping the tool with the clamping screws.

---

This invention relates to tool posts for holding at least one tool such as a metal turning tool in a lathe or other machine tool.

The object of the invention is to provide an improvement or modification of the tool post set forth in my prior United States patent application No. 414,761, now Patent No. 3,329,048 whereby a simplified and more compact arrangement of such a tool post is provided together with the same advantage of enabling a tool to be readily set to the required position and firmly and positively clamped to withstand heavy and prolonged working conditions.

In the accompanying drawings:

FIGURE 1 is a side elevation of a tool post embodying this invention,

FIGURE 2 is an end elevation in the direction of the arrow II of FIGURE 1, and

FIGURE 3 is a cross section taken on the line III—III of FIGURE 1.

Referring to the drawings the tool post shown is of usual form in that it consists of a block 1 adapted to be bolted by the bolt 2 and T-nut 3 in position on a lathe slide or the like and is provided in one face with a transversely normally horizontally disposed recess 4 which receives a shank of a cutting tool indicated at 5 for clamping therein.

For applying clamping pressure to the tool 5, screw means is provided by a pair of screws 6 threaded in an upper part of the block 1, and arranged to act downwardly on the tool shank 5 in the usual manner.

In order to provide support for the tool 5 and abutment against the clamping pressure, the tool post includes one or more abutment or support elements 7 such as a pair thereof corresponding to the clamping screws 6 and opposed to the latter.

The elements 7 are shown consisting of pins slidable vertically in corresponding bores 9 provided in a lower part of the tool post block 1 and arranged to be operated together for simultaneous and corresponding fine adjustment in a self locking manner by inclined face co-action with a screw operated transverse actuating pin 10 carried for axial movement in a bore 11 in the lower part of the block 1 and substantially at right angles to the abutment or support pins 7.

Thus the lower end of each support pin 7 is provided with an inclined face 17 (e.g. at 45° or thereabouts) which cooperates with a corresponding inclined surface 20 on the actuating pin 10 so that the pins 7 may be raised or lowered by corresponding axial movement of the pin 10.

One of the inclined faces 20 on the actuating pin 10 is provided at one end of the latter for operating a corresponding support pin 7 whilst an intermediate portion of the actuating pin is cut away to provide the other inclined surface 20 for similar actuation of the other support pin 7.

For self locking operation of the actuating pin 10 in accordance with this invention the block 1 carries by means of a mounting member or plate 31 an operating or set screw 32 arranged to abut the other end of the actuating pin 10 whereby on apppropriate operation of the screw the pin 10 is moved axially for thrusting it into inclined face co-action with the support pins 7 for raising the latter and a tool 5 supported thereby. On operation of the screw 32 in the reverse or outward direction, the actuating pin 10 is free to return or follow the screw and thus permit lowering of the support pins 7 and tool 5.

As will be appreciated the actuating pin 10 can be readily operated in a self locking manner for finely setting the tool 5 in the required position of use prior to firmly clamping the latter by the screws 6.

Particularly when lowering the tool 5 by unscrewing movement of the operating screw 32, proper contact of the inclined faces 17 with the co-operating faces 20 of the actuating pin 10 can be ensured by finger or other light pressure on the tool shank prior to clamping down by the screw 6.

In order to minimise projection from the block the operating screw 32 is preferably of the socket type shown whilst it may, if desired, be threaded direct in the body of the block 1 provided adequate threaded engagement is ensured having regard to the axial thrust of the actuating pin 10 on the screw 32 when under clamping pressure of the screws 6 through the tool 5 and pins 7. However the provision of the mounting plate 31 bolted at 33 to the block 1 facilitates the forming and finishing of the bore 11 in the block 1 for the actuating pin 10.

Not only does the present invention provide a very much simplified operating mechanism for the actuating pin 10 but in addition the operating screw 32 is conveniently situated when the tool post is mounted in position of use whilst the dimensions of the latter may remain substantially the same as those of a normal post.

Although the tool post has been herein described as used in the normal upright position, it is to be understood that it is capable of use in any other position if necessary and with the same advantages. Furthermore and although described as applied to a single way post, operating mechanism according to this invention is capable of repeated embodiment with especial advantage as regards simplicity and compactness in a multi-way post such as a two-way or four-way post for setting corresponding tools held in the latter.

I claim:

1. A tool post of the character described comprising a mounting block having a transverse recess therein for receiving a tool shank; abutment pins carried by the block at right angles to said recess for relative axial adjusting movement and having heads extending in said recess for contact at right angles with a tool shank received therein, the other ends of said pins having inclined faces; clamping screw means carried by said mounting block at right angles to said recess and opposed to said abutment pins for clamping a tool shank against the heads of said pins; an actuating pin axially movable in said block parallel to said recess and having inclined faces co-operating with those of the said abutment pins for effecting axial adjustment of the latter for tool setting purposes prior to clamping of a said tool shank by the clamping screw means; and an operating screw carried by the mounting block for endwise abutment with an end of the actuating pin so as to impart axial movement thereto and hence to the abutment pins in a self locking manner on rotation of said operating screw.

2. A tool post according to claim 1 wherein the operating screw is threaded through a mounting member secured to a side of the mounting block.

References Cited

UNITED STATES PATENTS 3,143,906  8/1964  Smith _____ 82—37

LEONIDAS VLACHOS, Primary Examiner